(12) United States Patent
Anderson et al.

(10) Patent No.: US 10,963,848 B1
(45) Date of Patent: Mar. 30, 2021

(54) IDENTIFYING, SOLICITING, SELECTING AND SCHEDULING SERVICE PROVIDERS

(75) Inventors: Ethan Anderson, San Mateo, CA (US); Yaron Binur, San Mateo, CA (US); Aaron Lee, San Mateo, CA (US); Emile Petrone, San Francisco, CA (US)

(73) Assignee: Home Depot Product Authority, LLC, Atlanta, GA (US)

( * ) Notice: Subject to any disclaimer, the term of this patent is extended or adjusted under 35 U.S.C. 154(b) by 294 days.

(21) Appl. No.: 12/725,439

(22) Filed: Mar. 16, 2010

Related U.S. Application Data

(60) Provisional application No. 61/160,434, filed on Mar. 16, 2009.

(51) Int. Cl.
*G06Q 30/02* (2012.01)
*G06Q 20/08* (2012.01)

(52) U.S. Cl.
CPC ......... *G06Q 20/08* (2013.01); *G06Q 30/0217* (2013.01); *G06Q 30/0282* (2013.01); *G06Q 30/0283* (2013.01)

(58) Field of Classification Search
CPC .............. G06Q 20/08; G06Q 30/0282; G06Q 30/0217; G06Q 30/0283
See application file for complete search history.

(56) References Cited

U.S. PATENT DOCUMENTS

| | | |
|---|---|---|
| 5,758,328 A | 5/1998 | Giovannoli |
| 5,842,178 A | 11/1998 | Giovannoli |
| 6,141,007 A * | 10/2000 | Lebling .................. G06F 16/34 715/792 |
| 6,642,946 B1 * | 11/2003 | Janes .................. G06Q 10/087 715/769 |
| 6,895,406 B2 * | 5/2005 | Fables et al. ................. 707/765 |
| 6,963,848 B1 * | 11/2005 | Brinkerhoff ................. 705/7.32 |
| 7,908,200 B2 * | 3/2011 | Scott et al. .................... 705/37 |
| 7,970,690 B2 * | 6/2011 | Diana et al. .................... 705/37 |
| 7,983,960 B2 * | 7/2011 | Rigole ....................... 705/26.41 |

(Continued)

OTHER PUBLICATIONS

K. Lin, "E-Commerce Technology: Back to a Prominent Future," in IEEE Internet Computing, vol. 12, No. 1, pp. 60-65, Jan.-Feb. 2008 (Year: 2008).*

(Continued)

*Primary Examiner* — Gerardo Araque, Jr.
(74) *Attorney, Agent, or Firm* — Greenberg Traurig, LLP

(57) ABSTRACT

A system facilitates identifying service providers capable of performing services for users and enable the pricing and scheduling of services to be performed by the service providers. A user submits a service request including a service description and optionally service constraints such as a required service location and service time. The system matches the service request with service providers potentially suitable for performing the requested service. The system sends bid solicitations to matched service providers, who may then respond with requests for additional information or bids. The bids are presented to the user, who then selects the bid best suited for his or her needs. The service provider associated with the selected bid is notified of the user's selection, thereby scheduling the service. A social graph associated with the user may be used to assist users in selecting bids.

28 Claims, 4 Drawing Sheets

(56) References Cited

U.S. PATENT DOCUMENTS

| | | | | |
|---|---|---|---|---|
| 2001/0032170 | A1* | 10/2001 | Sheth | G06Q 10/0631 705/37 |
| 2003/0182413 | A1* | 9/2003 | Allen et al. | 709/223 |
| 2008/0189207 | A1* | 8/2008 | Wurster | G06Q 10/02 705/40 |
| 2009/0265229 | A1* | 10/2009 | Sidhu | 705/14 |

OTHER PUBLICATIONS

Sung Ho Ha and Sang Chan Park, "Matching buyers and suppliers: an intelligent dynamic exchange model," in IEEE Intelligent Systems, vol. 16, No. 4, pp. 28-40, Jul.-Aug. 2001 (Year: 2001).*

Minghua He, N. R. Jennings and Ho-Fung Leung, "On agent-mediated electronic commerce," in IEEE Transactions on Knowledge and Data Engineering, vol. 15, No. 4, pp. 985-1003, Jul.-Aug. 2003 (Year: 2003).*

Innovation & Information Consultants, Inc., Impact of Electronic Data Interchange on Small Firms, 212 pages, Cambridge, MA, Jul. 1995.

Zimmerman, Jan, Doing Business with the Government Using EDI—A Guide for Small Businesses, 34 pages, Van Nostrand Reinhold—A Division of International Thomas Publishing, 1996.

Wilson, Linda, Datamatix EDI-based system put to test by California governments, InformationWeek, Networking; p. 76, Jun. 20, 1994.

Lewis, Peter H., Internet for Profit; businesses rush to capitalize on the Internet, Computer Shopper, p. p178(9) vol. V14 No. N11 ISSN: 0886-0556, Nov. 1, 1994.

Is there gold in the Internet?, The Economist, Business; p. 73, Sep. 10, 1994.

Doing Business on the Internet, IBM System User, p. p43(1) vol. V15 No. N7 ISSN:0950-303X, Jul. 1, 1994.

Radosevich, Lynda; CW Staff, U.N.s global trade net to connect 50 countries, Computerworld, Electronic data interchange; p. 1, May 16, 1994.

Willett, Hugh G., New Service Set for Commerce Via Net, Electronic Buyers' News, News, p. 1, Apr. 11, 1994.

Bockanic, William N.; Lynn, Marc P., Electronic Contracts—law and technology, Journal of Systems Management, p. p64(2) vol. V46 No. N4 ISSN:0022-4839, Jul. 1, 1995.

Briefs, Network World, Electronic Commerce; p. 41, Jun. 12, 1995.

Hess, Christopher M.; Kemerer, Chris F., Computerized loan origination systems: An industry case study of electronic markets hypothesis, MIS Quarterly, vol. 18, No. 3; p. 251-275; ISSN: 0276-7783; CODEN: MISQ, Sep. 1994.

Brown, Andrew D.; Boyett, Inger; Robinson, Phil, The dynamics of partnership sourcing, Leadership & Organization Development Journal, vol. 15, No. 7; p. 15-18; ISSN:0143-7739; CODEN:JOMA, 1994.

Crockett, Barton, Financial EDI pits banks against VANs, Network World, Inc. Top News; p. 1, Jun. 18, 1990.

Value-Added Providers Fill Niche for Business But Is It Really EDI?, EDI News, vol. 1 No. 10, Jan. 8, 1996.

Yukins, Chirstopher, Managing electronic commerce on the Federal acquisition computer network (FACNET), National Contract Management Journal, vol. 27, No. 1 p. 35-49; ISSN: 1045-1668; CODEN: NCMJB9, 1996.

Schriener, Judy; Angelo, William J., Procurement going paperless, Engineering News-Record, News; vol. 235, No. 14; p. 13, Oct. 2, 1995.

Kutler, Jeffrey, Information superhighway looking more and more like a business route, American Banker, p. p14(2) vol. V159 No. N222 ISSN: 0002-7561, Nov. 18, 1994.

The quick tour: a summary of approaches; electronic commerce industry overview, Release 1.0, p. 6(14) vol. V95 No. N1 ISSN: 1047-935X, Jan. 24, 1995.

Hamilton III, Walter P.; Henderson, Morey M., A Handbook for DoD and Small Business—Forging a Partnership Through EDI, 74 pages, Logistics Management Institute, Bethesda, MD, Jul. 1992.

Neches, Robert, et al., Electronic Commerce on the Internet, 11 pages, USC/ Information Sciences Institute, Mar. 1994.

Clarke, Matthew T., Federal Acquisition Network Implementation and Certification, 109 pages, Naval Postgraduate School, Monterey, CA, Jun. 1995.

Van Kirk, Doug, Government lab advances electronic commerce—Lawrence Livermore project combines EDI, X.400 messaging, Internet technologies, Infoworld, p. 60, Jan. 17, 1994.

Messemer, Ellen, Defense Dept.'s EDI project flying high, Network World, pp. 25, 28, Jan. 25, 1993.

Messemer, Ellen, Defense Dept. begins pilot test of model EDI network, Network World, pp. 2, 64, Aug. 19, 1991.

Network World, An International Data Group Publication, pp. 1, 59, vol. 11, No. 15, Apr. 11, 1994.

Net Profits, The Economist, Survey; p. S12, Jul. 1, 1995.

The world wide web: open for business, Computer Shopper, p. p600(3) vol. V15 No. N2 ISSN: 0886-0556, Feb. 1, 1995.

EDS Becomes Sponsoring Member of Commercenet; EDS Joins Consortium to Develop Electronic Marketplace on the Internet, PR Newswire, Financial News, Mar. 31, 1995.

* cited by examiner

« Back to pending jobs

| Job description | Bidding ended |

Need a housekeeper to come over every other week and clean the house and do the laundry. 94040 (Mountain View, CA)
Start date: Dec 1, 2008. Requests weekly.       205                                          207

Questions about this job

Review quotes and schedule job

Sort by [ ▾ ]  ☐ Show only bonded/insured

Molly Maid $100  220          Schedule job
***** (45) - Reviews: 27

Molly Maid $100                   Schedule job
***** (45) - Reviews: 27

Molly Maid $100                   Schedule job
***** (45) - Reviews: 27

Molly Maid $100                   Schedule job
***** (45) - Reviews: 27

Molly Maid $100                   Schedule job
***** (45) - Reviews: 27
                         225

Molly Maid

Every family's home is unique and so are their cleaning and maid service needs. That's why we tailor our house cleaning services to your home and your lifestyle. You tell us what you want and we will do our very best to meet your needs.

Reviews:

***** by someone123 - October 22, 2009

If it helps at all, I have used Molly Maids service in Fargo, ND. They all start off somewhat good but with each subsequent the service jus got worse. They start off being very accommodating of you. It got to a point after 3 months I had to call suspend their services. Incidentally it was the day of their clean in my house.

***** by someone123 - October 22, 2009

If it helps at all, I have used Molly Maids service in Fargo, ND. They all start off somewhat good but with each subsequent the service jus got worse. They start off being very accommodating of you. It got to a point after 3 months I had to call suspend their services. Incidentally it was the day of their clean in my house.

***** by someone123 - October 22, 2009

If it helps at all, I have used Molly Maids service in Fargo, ND. They all start off somewhat good but with each subsequent the service jus got worse. They start off being very accommodating of you. It got to a point after 3 months I had to call suspend their services. Incidentally it was the day of their clean in my house.

More reviews »
                                  215

« Back to pending jobs

FIG. 2

IDENTIFYING, SOLICITING, SELECTING AND SCHEDULING SERVICE PROVIDERS

CROSS-REFERENCE TO RELATED APPLICATIONS

This application claims priority to U.S. Provisional Patent Application No. 61/160,434, filed Mar. 16, 2009, and entitled "Identifying, Soliciting, Selecting and Scheduling Service Providers," which is incorporated by reference herein for all purposes.

BACKGROUND OF THE INVENTION

The invention relates generally to the field of internet search, and in particular, to systems and methods for identifying services required by users, soliciting and accepting bids for services from appropriate service providers, scheduling the performance of services by service providers, and rating the performance of service providers.

Consumers often hire service providers to perform tasks. For example, a consumer might hire a babysitter to care for a child, a plumber to fix a leaking faucet, or a general contractor to construct and install kitchen cabinets. In general, a service provider is any person, company, organization, or other entity that offers services to consumers. A service provider may provide only services, for example a babysitter or a personal assistant, or provide services in conjunction with goods, such as a contractor that installs cabinets or a plumber that replaces pipes. For this application, the term consumer may refer to any entity that requests a service from a service provider, including individual users, companies, organizations and government agencies.

Previously, consumers looking for service providers have utilized telephone directories, lists of recommended businesses from professional organizations, such as the Chamber of Commerce or the Better Business Bureau, or word-of-mouth recommendations from friends, family, colleagues, and business associates. More recently, online versions of these types of directories have become available. Previously, three broad categories of online local search have emerged to date:

The first major category of online local search is the online directory, which are web sites or electronic equivalents of telephone directories and other types of business directories. These online directories typically include features such as searching or browsing by key words or categories. Electronic directories are most useful when consumers already have a business category or business name in mind.

The second major category of online local search is rating and review web sites, which are analogous to lists of recommended businesses and word-of-mouth recommendations. These web sites provide editor-generated or user-generated ratings and reviews of businesses, which act as a form of decision support for consumers who generally do not have first-hand familiarity with the business but want to gauge the quality of their services to determine if they want to become a customer.

The third major category of online local search is lead generation sites. These sites accept requests for services from consumers and broker them out to potential service providers. The service providers must then contact the interested consumers directly to attempt to win their business.

All of the previous offline and online local search systems fail to meet numerous consumer needs. First, consumers often do not know the proper name of the service category or the occupation of the person needed to complete a given task. In these cases, the local search options available today provide little value because the consumer lacks the knowledge required to perform an effective search.

Second, many consumers have specific time and/or location requirements for services. For example, a consumer may require a babysitter for a specific day and time and at their home or relatively nearby. Prior local search systems and online directories do not typically include any time and/or location specific constraints when identifying service providers. Thus, consumers using these prior systems cannot efficiently determine which locally-based service provider(s) are available to complete the service at the desired place and time. Instead, consumers typically must generate a list of potential service providers and then call or email each one of them individually to determine their availability. This is a time-consuming and tedious process that represents a significant burden to the consumer.

Third, consumers do not have a way of knowing which service provider will offer the best possible value because they lack up-front pricing information from prospective service providers. To determine pricing, consumers generally must visit each service provider's web site or call or email each of them separately. This also is a time-consuming and tedious process that represents a significant burden to the consumer.

Fourth, consumers often struggle to decide which service provider to choose when faced with many possibilities. The primary existing mechanism in internet local search to help consumers decide on a prospective service provider is the sharing of ratings and reviews left by other customers. However, this method suffers from a high number of false or biased ratings (e.g., negative ratings left by competitors or positive ratings left by the business owner's friends or the owner himself) which greatly undermine their value. Furthermore, there is no validation that a reviewer ever used the service provider and has first-hand knowledge of the service provider, thereby diminishing the value of the review.

Additionally, all of these prior types of local search systems and online directories fail in several respects to meet the needs of service providers.

First, service providers do not have a way to be connected with potential customers who want to hire them at the time the service provider is available to work. Many service providers have busy schedules but have gaps in their schedules during which they could provide additional services. They currently lack a good way to fill these gaps which results in lower work utilization and productivity. By contrast, service providers have little interest in being contacted by consumers who want a service initiated at a time when the service provider is unavailable to work due to prior commitments or because the requested time is outside their standard working hours. Furthermore, casual or part-time service providers may have very limited schedules for accepting services. With prior systems, it is very difficult for these types of service providers to find customers seeking services during the hours they work.

Second, service providers face difficulty in making potential customers aware of their business. They spend great sums of money on local advertising, but much of this is wasted as potential customers ignore the ads or choose a competitor instead. The lead generation sites are also an inefficient source of spending because service providers pay for each service lead, rather than for services they provide due to the lead. Furthermore, multiple service providers pay lead generation fees for a single lead, and at most, only one of them will win the service.

SUMMARY

An embodiment of the invention includes a system that facilitates identifying service providers capable of performing services for users and enable the pricing and scheduling of services to be performed by the service providers. A user submits a service request including a service description and optionally service constraints such as a required service location and service time. The system matches the service request with service providers potentially suitable for performing the requested service based on information associated with service providers and the service request. The service request can include text, pictures, video, audio, or other multimedia data to enable service providers to accurately evaluate service requests.

In an embodiment, the system sends bid solicitations to matched service providers, who may then respond with requests for additional information from the user or with bids. The bids are presented to the user, who then selects the bid best suited for his or her needs. An embodiment of the system may present reviews, ratings, and evaluations of service providers and provide users with tools for filtering and sorting bids based on user-specified criteria.

An embodiment of the invention allows a user to select at least one winning bid from the set of bids presented. In an embodiment, the system notifies the one or more selected service providers selected by the user, thereby scheduling the service. Multiple bids may be selected by the consumer if the consumer requires multiple service providers to perform the service. In a further embodiment, if the desired service requires an on-site estimate or other evaluation by a service provider, then the consumer may select multiple bids to schedule times and locations for the associated service providers to visit the service location and for this evaluation. The winning service provider may be charged by the system upon selection of its bid by the user.

In an embodiment, a social graph associated with the user may be used to assist users in selecting bids. A service request notification may be provided to peers of the user via a social network service or other application. Peers of the user may provide responses to the service request notification including reviews and ratings of service providers and bids and recommendations for additional service providers. An embodiment of the invention may send a bid solicitation to an additional service provider in response to receiving a recommendation from a peer of the user. Peer responses to the service request notification may be presented separately or in aggregate to the user to assist in the selection of a bid.

BRIEF DESCRIPTION OF THE DRAWINGS

The invention will be described with reference to the drawings, in which:

FIG. 2 illustrates an example user interface for reviewing and selecting bids according to an embodiment of the invention;

DETAILED DESCRIPTION

Figure 1:
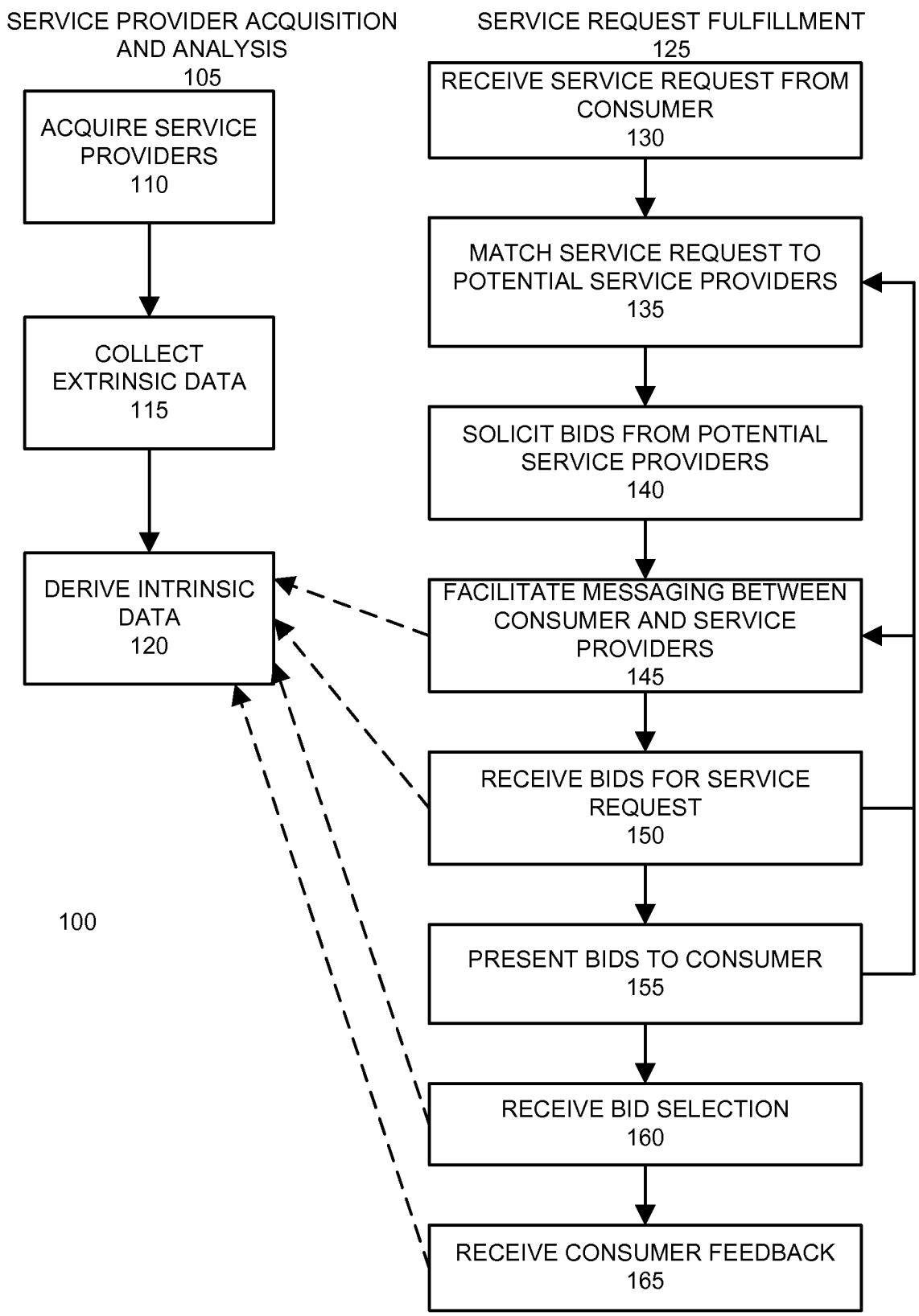
FIG. 1 illustrates an example operation of a system according to an embodiment of the invention.

An embodiment of the invention provides a way for consumers to identify service providers capable of performing a desired service, including any constraints on time and location. An embodiment of the invention further provides a way for consumers to solicit bids from one or more service providers for a desired service, including any constraints on time and location, and to accept a bid from a service provider to schedule and to initiate the service. In addition, an embodiment of the invention provides consumers with the specific information they need to pick a qualified service provider who can complete the service at the time, place, and price that best meets their needs. Following completion of the service by the service provider, an embodiment of the invention elicits feedback from the consumer regarding the service performed by the service provider.

Embodiments of the invention may leverage the social graph of a consumer to facilitate the selection of bids from one or more service providers. A social graph is the set of relationships between a consumer and other people or entities, referred to generally as peers. The relationships in a social graph may be any type of professional, social, or relationship, such as friendship relationships, kinship relationships, business relationships, professional relationships, or relationships based on common interests or needs, Social graphs are often implicitly embedded in the applications and services used by a consumer. For example, a customer's e-mail account and/or application includes a social graph of the people or entities that the customer communicates with. Customers may also explicitly define their social graph using one or more dedicated social network services or applications. For example, a customer may use a social network service to define relationships with other people by adding them to a list of friends or colleagues maintained by the social network service. Additionally, a consumer may use a social network service to specify one or more of their interests or affiliations. The social network service may then define relationships between the consumer and other users of the service having similar interests or affiliations. Peers may also include members or users of third-party web sites that include an embedded version of the system, as described above.

A consumer's objective is to complete a given task. To accomplish this objective, the consumer needs to enlist the help of a qualified service provider to perform one or more services. An embodiment of the invention includes four aspects that enable a consumer to identify an appropriate service provider and initiate the service.

1. An embodiment of the invention enables consumers to identify the type of services and service providers that may accomplish the task they need completed, and optionally at the time and place of their choosing.

2. An embodiment of the invention solicits bids from service providers based on the identified services and service providers and presents the bids and other information to the consumer, allowing the consumer to identify the service provider most capable of meeting the consumer's needs, in terms of price, quality, availability, and/or other factors.

3. An embodiment of the invention provides the consumer with various non-price information to help them choose between potential service providers based on quality and other factors, including ratings and reviews from other users of the service providers, advice or recommendations from peers of the consumer in one or more social graphs, and service provider licenses, certifications, and memberships in professional organizations. In a further embodiment, non-price information is used to identify potential service providers from which to solicit bids.

4. An embodiment of the invention enables consumers to schedule a service at the time and place that is most convenient for them.

For the service provider, an embodiment of the invention identifies the capabilities and availability of service providers to provide potential services to consumers. Upon receiving a request from a consumer for a service, an embodiment of the invention identifies one or more service providers potentially suited to provide the appropriate service and solicits bids from these service providers, which are subsequently presented to the consumer.

FIG. 1 illustrates an example operation of a method 100 according to an embodiment of the invention. The operation of this embodiment may be divided into two phases: service provider acquisition and analysis 105; and service request fulfillment 125.

Service Provider Acquisition and Analysis 105

In an embodiment, the first phase of service provider acquisition and analysis 105 begins with service provider acquisition 110, followed by collection of extrinsic service provider data 115, and analyzing intrinsic service provider data 120.

In an embodiment, service provider acquisition 110 initially identifies service providers through marketing, online or offline directories, professional organizations, or referral services, including public and private data sources as telephone directories, online local directories, or purchased lead lists. Embodiments of the service provider acquisition 110 may contact service providers via email, telephone, mail, facsimile, or SMS with a message describing the features and benefits of method 100. Another embodiment of service provider acquisition 110 may utilize a human salesperson or automated telephone voice system to contact the unregistered service provider and walk them through the process of signing up and bidding on the service. Upon agreeing to participate in using the method 100, service providers access a web site or other application to create an account.

In another embodiment, service provider acquisition 110 sends solicitations via email, telephone, mail, facsimile, web browser or other application, or SMS to service providers who have not previously registered to use method 100. As an incentive to register with method 100, an embodiment of the service provider acquisition may offer unregistered service providers the opportunity to bid on a service request from a customer. This embodiment may be used in situations in which there are an insufficient number of registered service providers of a specific occupation and geography who match to a service request. An opportunity to bid on a service request provides a strong incentive for the service provider to sign up quickly since the auction is of limited duration. In one implementation of this embodiment, a service provider may be provided with a virtual or physical coupon or redemption code that enables them to bid on the specific service after they sign up.

In another embodiment, an unregistered service provider may bid on a service request prior to registering with the system. Following submission of the bid, the unregistered service provider may be prompted to register with the service to receive the information necessary to complete the service request, such as the consumer's contact information.

An embodiment of the invention collects extrinsic data 115 from service providers to build a skills profile for the service provider. In an embodiment, service providers become eligible to receive service requests from consumers by creating one or more skills profiles. The skills profile provides the system with data to be used to match the service provider with service requests received from consumers. An embodiment of the method 100 collects extrinsic data 115 from service providers using one or more online or offline forms. Examples of extrinsic data may include an occupation, business description, skills and talents, certifications, licenses, insurance/bonding status, memberships in professional organizations, and physical location and distance from which they are willing to travel to perform services.

In a further embodiment, the collection of extrinsic data 115 enables a service provider to selects at least one occupation type for their skills profile. This embodiment of the invention uses the notion of occupation type and occupation names to assist in matching service providers with service requests. In an embodiment, an occupation type is a unique profession and serves as a common element for matching consumer service requests with service providers. Occupation types may be an internal classification not exposed to end users, such as consumers and service providers.

A related concept is an occupation name. In an embodiment, occupation names are user-visible names that refer to a single occupation type. An occupation type can have one or more occupation names associated with it, which is necessary because there are often multiple occupation names for the same profession. For instance, police officer, cop, constable, and peace officer are occupation names which all refer to the same occupation type.

Further embodiments may collect additional extrinsic data about service providers from online directories and review web sites, professional organizations, public records, or other public or private data sources. For example, if a service provider registers with the system, an embodiment of step 115 may automatically search for the service provider in a directory or database of professional organizations, public records, or other public or private data sources. The results of this search may be used to automatically add further information to the service provider's profile, such as professional memberships, endorsements from professional organizations, certifications, professional licenses, and/or background checks.

In addition to the extrinsic data provided by service providers or other data sources, an embodiment of method 100 also analyzes extrinsic data and consumer and service provider interactions with the method 100 to derive additional data 120 to be used in matching service providers with service requests. This additional derived data is referred to as intrinsic data. Intrinsic data may be created or derived 120 in part at the time a service provider registers with the system. Intrinsic data may also be created or derived 120 in part following the time a service provider registers with the system, for example using an offline or background process. Additionally, intrinsic data may be updated 120 following interactions of consumers and service providers with the system. Intrinsic data is any data that is not explicitly collected from the service provider or consumer, but is instead collected, derived, or inferred from other data sources or the behavior of one or more service providers or consumers.

An embodiment of method 100 derives intrinsic data 120 using natural language processing to extract keywords and phrases and other attributes that can be used for matching service providers to a service request. Additionally, these keywords and phrases may be used at least in part to rank service providers for suitability for a service request.

In addition to or instead of natural language processing, embodiments of the method 100 include one or more databases or other data structures to assist in deriving intrinsic data 120, classifying service requests, and selecting qualified service providers. An embodiment of these one or more databases can include data fields such as:

Occupation Type, which is a high level notion of a single occupation that is represented as a unique code. The goal is to have each service request and each service provider's skills profile associated with a single occupation type.

Occupation Name, which is a human readable name of an occupation. Each occupation name is associated with a single occupation type. There may be more than one occupation name for each occupation type.

Occupation Internal Name, which is a human readable name of an occupation that is not exposed to the user but is rather used for indexing, searching and matching user input with occupation types.

Occupation Tags, which are keywords associated with a specific occupation type. An occupation tag can be associated with multiple occupation types. Tags may be used for indexing, searching and matching user input with occupation types.

Service Provider Business Descriptions, which are descriptions written by or associated with service providers to describe their business.

Service Provider Skill Tags, which are words or phrases entered by or associated with service providers that describe or characterize their skills or abilities.

Learned Service Provider Representation, which are additional attributes associated with service providers and/or occupation types based on learned associations. For example, an embodiment of the invention may analyze those service request descriptions that were bid on or rejected by a particular service provider in order to identify statistically significant words, phrases, or other service request attributes. These statistically significant attributes may be used as positive or negative weights in determining whether to solicit a bid from a service provider for future service requests.

Service Request Fulfillment 125

In parallel and asynchronously with the first phase of service provider acquisition and analysis 105, an embodiment of the invention performs a second phase of operation for service request fulfillment 125. The phase of service request fulfillment 125 includes receiving service requests from a consumer 130; matching the service request to potential service providers 135; soliciting bids from potential service providers 140; facilitating messaging between service providers and the consumer 145; receiving bids from the service providers for the service request 150; presenting the bids to the consumer 155; receiving a bid selection from the consumer 160; and receiving consumer feedback 165.

In an embodiment, the phase of service request fulfillment 125 begins with receiving a service request from a consumer in step 130. In an embodiment of step 130, consumers access a web site or other application to generate a service request. A consumer may input a type of service and/or occupation they are seeking (e.g., carpet cleaner), optionally specifying where and when the service should be performed. A consumer may also provider an additional description of the service in the form of text, pictures, video, audio, electronic documents, or other multimedia data.

When a consumer requires a service immediately, for example an emergency repair service, an embodiment of method 100 enables consumers to initiate a separate type of auction that alerts only qualified service providers who have indicated they are available to work at the time the consumer makes the service request or while the service request is still pending and unfulfilled.

In an embodiment, when a consumer enters a service request into the system, a consumer may optionally select or input one or more occupation names for the service provider who they believe would best fit the service they requested. Using this information, an embodiment of the invention may be able to perform an initial match between a service request and one or more qualified service providers based on the match between the occupation type associated with the provided occupation names.

Ideally, a consumer would know the type of service provider best qualified to perform a service; however, this is often not the case. Embodiments of step 130 may apply many different types of analysis to identify service providers suitable for handling a consumer's service request. In one embodiment of step 130, natural language processing techniques are used to analyze a user's description of a service to identify one or more types of appropriate service providers.

In one approach to this embodiment, natural language processing is used to identify one or more types of appropriate service providers using model building and search inference. Model building is performed offline and builds tables that associate words in a language to related professions. A word can be related to more than one profession—so instead of having a simple word to profession model, we have a word to profession model associated with weights. These weights are like probability distribution over the set of all professions. Once the model building is complete, search inference is used in conjunction with memory hash tables to perform the inference process.

Another embodiment of step 130 may identify the best service providers from a service request description alone, without the consumer providing an occupation name. For example, this embodiment of step 130 may ascertain one or more occupation types required to fulfill service requests, as well as the occupations of service providers utilizing the system, using the notion of occupation type and/or other extrinsic and intrinsic data associated with service providers.

A first implementation of this embodiment of step 130 extracts occupation types from similar services. For a new service request received from a consumer, an embodiment of method 100 uses a similarity function to identify previously requested service requests that share common attributes with the received service request. For example, an embodiment of method 100 determines which services were most "similar" to the new service request and analyzes the occupation type of the service providers who bid on and won the similar services. In a further embodiment of step 130, a large number of similar service requests are clustered and only those occupation types that appear most frequently are selected. In this way, an embodiment of method 100 can determine the most likely occupation needed for a received service request by examining the most likely occupation(s) needed for similar service requests. If several occupation types appear in great frequency in similar previously received service requests, then an embodiment will ask the consumer which occupation they believe is the best fit for their particular service, or alternatively select qualified service providers from multiple occupation types.

An embodiment of step 130 includes three ways to help users find the occupation type for their service request:

1. When consumers enter a service request, an embodiment of step 130 auto-suggests relevant occupation names in real-time as they begin to type an occupation name for the service they want done. This is accomplished through a keyword match between the letters the consumer is typing and occupation names or internal names (other non-user visible synonyms for the occupation) in the database.

2. An embodiment of step 130 may associate additional keywords with occupation types. When consumers enters a service request that does not return an exact match with an occupation name in the occupation database, an embodiment will return a list of close matching occupation types for the consumer to choose from. This list of occupations is generated by a keyword match with various occupation keywords associated with an occupation type (e.g., the occupation plumber may have keywords such as pipes, toilet, and leaking).

3. When service providers create a skills profile, they can choose an occupation name by browsing through a hierarchy of occupation names or by entering a search for their occupation name. In the case of search, an embodiment of the method 100 will return a list of the closest matching occupation names for the service provider to choose from based on a keyword match of occupation names, occupation types, occupation keywords, and internal names.

In a second implementation of step 130, the use of occupation type is bypassed altogether by relying on a direct match between service requests and service provider skill profiles. In this implementation, an embodiment of the method 100 would find past service requests similar to the one in question, analyze the skill profiles of service providers who bid on and/or won the similar services, and then compare those skill profiles to other service provider skill profiles in the system to generate a candidate list of the most qualified service providers to bid on the new service, all without ever directly referencing occupation type. In this implementation, the service request from the customer does not need to include an occupation type.

An embodiment of method 100 identifies the specific service providers who are qualified and best suited to meet a consumer's needs for the received service request in step 135. In general, step 135 may match potential service providers with a service request based on the type of service request, the location of the service request, the time requested and other preferences.

In an embodiment of step 135, an initial determination of an occupation type for the service request is used to identify an initial subset of potentially qualified service providers from the set of service providers associated with the system. Once an occupation type or a subset of potentially qualified service providers is identified, an embodiment of step 135 selects a subset of the potentially qualified service providers for soliciting bids to the consumer's service request. An embodiment of step 135 uses a two-step filtering and optimization approach to determine which service providers will receive the opportunity to submit bids on a service request. First, step 135 filters qualified service providers according to hard constraints, which are discussed in detail below. Second, step 135 filters and ranks qualified service providers according to soft constraints, which are also discussed in detail below. Alternate embodiments of step 135 may perform filtering and ranking in a different order, in conjunction with further types of data analysis, and/or combined into a single data analysis step.

In an embodiment, after identifying service provider candidates that meet all of the hard constraints, an embodiment of step 135 will rank order the list based on at least the soft constraints. Only the X highest ranking service providers will receive notifications about the service request, where X is predetermined rank threshold value. The service providers who are not within the first X spots on the ranking will not receive notification of that service.

Hard constraints are constraints that service providers must meet to receive a service request. Soft constraints are constraints that service providers do not have to meet, but that are used for ranking service providers. Depending on the context and the service request, a constraint may be used as a hard constraint or a soft constraint. In general, hard and soft constraints used by embodiments of the invention may include:

Occupation type: A match with the occupation type specified in a service request and a service provider's skills profile.

Availability: A match between service provider's availability window and consumer's preferred service start or completion time, for instance specified in the service request. In an embodiment, availability of a service provider may be obtained by service provider self-reporting, or by integration into a third-party calendaring application, web site, or service, or inferred from previous services scheduled by the system for that service provider Schedule: Whether a service has been previously scheduled for a given qualified service provider at the time of the service. Schedule information could be obtained by service provider self-reporting, or by integration into a third-party calendaring application, web site, or service, or inferred from previous services scheduled by the system for that service provider that conflict with the pending service request.

Credentials: A match with the consumer's stated requirement for licensing, bonding, insurance, or certification.

Geographic Location: A match with the work radius/area in which the service provider works and the service location specified in the service request.

Membership in Association or Community: A match with a membership in an association or community specified in service request.

Service Request Cap: Whether service provider has exceeded a cap on the maximum number of requests received per day or other time period set by the system or the service provider.

Distance to Service Site: Service provider's distance to service location from their current location (if using GPS/mobile device information) or their office location (if using the address they listed during registration).

Historical Success Rate (services won/bids offered): Number of service requests service provider previously won divided by total number of bids submitted.

Historical Abandonment Rate (services canceled/services scheduled): Number of scheduled service requests canceled by service provider divided by number of services scheduled for service provider.

Completed Services: Number of services service provider has completed on System, potentially taking into account recency such that newer services count more.

Average Price Deviation: Average amount that a service provider is above or below the mean or median bid price on previous services.

Bid Response Time: Speed with which service provider responds to current request or average speed with which they responded to past service requests weighted by number of previous requests received.

Rating: Average consumer rating service provider has received from consumers who used their services previously on the System Service Request Match Score: Similarity between service provider's skill profile and service request, calculated by using Natural Language Processing (NLP) to extract keywords/key phrases from service requests, and comparing them to keywords/key phrases in service provider's skill profile and/or with service requests the service provider has won previously.

Performance on Prior Service Requests: Win/Loss ratio on prior service requests similar to current service request. To determine if a prior service is similar to the current service request, an embodiment uses Natural Language Processing (NLP) to extract nouns or verbs in the current service request and compare them to nouns or verbs in service descriptions for prior services that were bid on by the service provider.

Relative Bid Acceptance Rate: Win/loss ratio of service provider on similar service requests by, for instance, utilizing collaborative filtering to determine if other consumers preferred the service provider over competing service providers on similar service requests.

Social Graph Connections: Whether service provider has performed services for consumer's "online friends or colleagues" in the past, whereas such social connections may exist on the system or a third-party service, such as social networking services or contact management services.

Service Request Overlap Match: Degree of word match between service request and service provider's self-reported business description, business name and skill tags divided by the sum of the number of words in each.

Cancellation Score: A penalty for canceling or not performing services that were previously won divided by the number of services won.

Duration of Membership on System: The amount of time since service provider first registered with the system.

Number of Service requests received from the system: Number of times a service provider matched for a service.

Number of Service requests won: Number of times or percentage of time that service provider was selected by a consumer to perform a service on which they matched.

Activity on System: Recency of last log-in, account modification or other activity on the system.

Pay for Performance: Payment by service provider to increase likelihood of service match or to guarantee given number of service matches within a set time period.

Traffic-based Estimate of Time to Service Site: Estimated time to travel via automobile from service provider's location to service site based on current or expected traffic conditions as obtained from traffic data sources.

An embodiment of step 135 calculates a service request match score for one or more potentially matching service providers using two steps:

First, an embodiment of step 135 creates a learned service provider representation. For each service provider skill profile, an embodiment of the method 100 stores intrinsic and extrinsic data, such as service provider self-description data and previous-service data. Extrinsic data such as service provider self-description data is the data provided to the system by the service provider, such as service provider's business name, business description, and skill tags which they have entered. Intrinsic data such as previous-service data is the data collected by the system from previous services in which the service provider was involved, including prior service requests received, services bid on, services won (selected by consumer), questions about services (Q&A), and services rejected (as when service providers reject service requests as "not applicable").

In an embodiment, the self-description data and the previous-service data forms a basis for a learning algorithm to build a learned service provider representation for each service provider skill profile. First, an embodiment of the system uses a NLP system to extract keywords and key phrases from both the service provider's self-description data and from their activity data (e.g., service descriptions that the service provider has bid on or rejected, questions and answers for those services, etc.). Second, an embodiment of step 135 builds a learned service provider representation, which consists of a weighted set of keywords and phrases which are most representative of what the service provider actually does by utilizing frequency analysis and structured analysis of data, as described below.

In one implementation of creating a learned service provider representation, frequency analysis is used. For example, keywords and phrases that occur more frequently than a certain threshold in the service provider's self-description and in their previous-service data (such as content of services requests previously bid on) are included in the learned representation, and are given a weighting proportional to their frequency of occurrence. Keywords and phrases that occur both in service provider's self-description and in their previous-service data are given an additional boost in their weight. An initial approach is to use a linear weighting scheme and an arbitrarily chosen threshold; both can later be adjusted depending on the desired outcome of the model and the size of available data.

In another implementation of creating a learned service provider representation, structural analysis is used to identify keywords and phrases that are representative of the things a service provider does. The way an embodiment achieves this is by using Machine Learning (ML) across all self-description and previous-service data (i.e., business profile descriptions and past service descriptions), and extracting linguistic structures of importance. For example, if the phrase, "fix X" (where X can be lamps, toilets, etc.), occurs in many self-descriptions of service providers, and furthermore, appears from previous-service data to be a reliable predictor of whether a service provider will bid on a service, then this phrase would be included in the learned service provider representation and be noted as a phrase of structural importance.

Phrases of structural importance are used to identify candidate representative phrases for service providers. For example, if a new service provider's self-description contains the phrase "we fix lamps", even if an embodiment has not seen this phrase or the word "lamp" in a self-description or service description before, an embodiment would identify "fix lamps" and "lamps" as candidate representative phrases on the basis that the structure of the phrase matches the previously noted phrase of structural importance, "we fix X".

An embodiment uses these methods to pick appropriate keywords/phrases and assign them weights which are collectively referred to as learned service provider representation. The weight of each keyword/phrase in the learned service provider representation represents how relevant that keyword/phrase is for what the service provider actually does. The weights can be both positive and negative, where a negative weight is assigned to the keywords that are representative of what the provider does not do. For example, if the service provider rarely accepts services with the keyword "clogged toilet", even though many services containing that keyword are offered to him, then the weight of the "clogged toilet" phrase in the learned service provider representation will be negative. These keywords and phrases thus become the predictive signals which the system can utilize to determine if a service provider is a good match with a particular service request.

To bootstrap the learned service provider representation for those service providers who do not yet have a significant history of services, an embodiment uses the NLP system to extract keywords and key phrases from other similar service providers to the one in question (e.g., perhaps through a common occupation type). An embodiment extrapolates that the presence or absence of those keywords which were important to other similar service providers are also relevant to the service provider in question in the context of matching the service provider to a service request. The bootstrapping is used with care and restraint so as not to overfit the data (i.e., just because Service Provider A does services x, y, and z, and Service Provider B does services x and y, it does not necessarily mean that Service Provider B does service z).

Once a learned service provider representation is created by step 135 using either frequency analysis and/or structural analysis of extrinsic and intrinsic service provider information, an embodiment of step 135 determines a service match score based on the service request for one or more service providers. In an embodiment of step 135, when a consumer submits a new service request, step 135 uses the following algorithm to determine and quantify which service providers are good matches for the request.

First, an embodiment of step 135 may use a NLP system to extract keywords and key phrases from the new service request. An embodiment may also use the structural analysis of data approach outlined above with regard to service providers to help determine which of the keywords and key phrases best represent the service request.

Once keywords and key phrases from a service request have been determined by step 135, an embodiment of step 135 matches the service request's extracted keywords and key phrases with the learned service provider representations, using the weights on keywords/phrases in the learned service provider representation to assign a match score to each service provider. The output for each analyzed service provider is a score which indicates how good of a match the service provider is for the particular service request. This is a critical step in determining which service providers have the appropriate expertise for the service request in question when they may belong to a broad occupation category with multiple subspecialties (lawyers, doctors, teachers, etc.).

Embodiments of step 135 attempt to match and rank qualified service providers to fulfill the consumer's service request based on the hard and soft constraints. First, hard constraints are used to select an initial set of service providers for further analysis. Then, the list of potential service providers initially selected is ranked, for example in order of their associated service match scores, to pare the list down so that only the top ranked service providers are notified of a service request. It is important to control for the number of service providers notified of any given service request because there is a cost to sending service requests to service providers, both financially (i.e., the cost of notifying via SMS or email, the impact on server loads) and on the user experience (i.e., the more service providers an embodiment notifies about a given service request, the more service providers will be disappointed they lost the service request since, at most, only one will win). There is also a cost to the consumer from having many service providers from which to select (the so called "Paradox of Choice"), which would diminish their experience.

In an embodiment, hard constraints are treated as essentially Boolean evaluations. A service provider either meets the requirement of the value or it doesn't. If it does not meet even a single hard constraint, it is no longer considered for the service request.

For soft constraints, an embodiment of the system "learns" the correct weighting associated with soft constraints using supervised machine learning. These weights associated with soft constraints are used to determine service match scores for service providers for a given service request. The system learns by analyzing past services, computing preliminary soft constraint weights for each service provider in contention to receive a service request, and comparing the service match scores to the final winner of the service. Over time, an embodiment of the system will determine which weights better predict the winning service providers. By doing this over a large number of services on an on-going basis, an embodiment of the system will continue to fine-tune and improve the weights associated with soft constraints. In many implementations, there may be significant differences in the weights of soft constraints for different occupations (e.g., for some occupations, quality is most important, for others distance to service is most important). Thus, the system may determine soft constraint weights at an occupation-specific level.

In one implementation of determining soft constraint weights, service providers are ranked by normalizing each soft constraint attribute to a range of [0,1], associating each attribute with a weight, and then computing a score based on the weighted sum of all these attributes.

In the following formulas, the variables are defined as:
j: the service requested by the consumer
P_j: one of the matched providers (the provider may or may not win the service, but will receive notification of the service)
N: number of soft constraints
V_pj: the vector of soft constraints of P for service j, the number of elements in V_pj is N
W: the weight vector for the soft constraints, each weight is in the range of [0, 1] and the length is N
S_pj: 1 if P_j won or 0 if P_j didn't win the service An embodiment defines the service match score for provider $$P\_j \text{ as } \frac{W \cdot V\_pj}{N},$$

which is the dot or inner product of the weight vector and the constraints vector, divided by the number of soft constraints. The service match score is used to determine the ranking of the service provider in the candidate pool and it represents an estimation of the probability that the service provider will have the winning bid for the service request.

Ideally, if set of weights assigned to the soft constraints is accurate, the service match score for the winning service provider would be close to 1 while the losing service providers would be close to 0. Hence, an embodiment of the invention uses the results of completed bids for service requests to find a set of weights for the soft constraints such that the difference between the scores and S_pj is close to zero. This is equivalent to minimizing |service_match_score_pj−S_pj|over all services j with its corresponding matched service providers. (i.e. MINIMIZE(SUM(|service_match_score_pj−S_pj|) over all services j with j's matched service providers p). An embodiment of the invention may use SVD (Singular Value Decomposition) to determine this minimization.

An embodiment can easily extend this idea by optimizing the weight vector W_t over a particular occupation type t. (i.e. MINIMIZE(SUM(|service_match_score_pj−S_pj| over all services j whose occupation type is t). In this scenario, different sets of weights will be assigned to soft constraints for each occupation type.

The general approach described previously optimizes one particular occupation type or an entire service match system. However, if a consumer has requested services using the system before, a further embodiment of step 135 can take into account consumer data in addition to service provider data to learn consumer behavior and preferences, such as whether particular consumers favor location, price, consumer rating, or certification. This embodiment of step 135 takes into account consumer preferences to adapt the optimization by considering in the dataset only those services that were requested by that consumer. (MINIMIZE(SUM (|service_match_score_pj−S_pj| over all services j that were requested by consumer c). This would generate one set of weights for this particular consumer based upon his/her past preferences.

In still a further embodiment, consumers may request specific "preferred" service providers to be included in the auction. A preferred service provider may be one who has won a previous service from the consumer, one which the consumer knew of and specifically requested, or one used and recommended by a trusted connection (via a social network or through a connection to another consumer using the invention). When a preferred service provider is requested, it supersedes hard and soft constraints and assures a service match. Thus preferred service providers are always given the opportunity to bid on a service.

When a service request is urgent or needed immediately, consumers can initiate a separate type of auction that alerts only qualified service providers who have indicated they are available to work at the precise time the request was made. For such urgent requests, the matching algorithm may vary. For instance, a higher weight may be given to the distance between the service site and the service provider's current location as determined by GPS, mobile phone, or address provided by the service provider during registration. Furthermore, traffic conditions obtained via APIs from various online sources of traffic data could be incorporated into the matching algorithm to attempt to estimate how much time each qualified service provider would take to arrive at the service site, giving preference to those who would arrive soonest.

Once step 135 has matched the service request to one or more service providers (and optionally received a selection of one or more preferred service providers), step 140 solicits bids from one or more of the service providers matched or selected in step 135. In an embodiment, step 140 may automatically notify the selected potential service provider about the service request, provide them with the opportunity to ask questions to clarify the nature of the service request, and/or submit a bid to perform the requested service. Embodiments of step 140 use notifications including information such as a description of the service requested, time and date the service should be performed, images of the job site or work required as provided by the consumer, willingness to pay as provided by the consumer, and other information. Embodiments of step 150 may send notifications of a service match to potential service providers via a variety of mechanisms, including email, SMS, automated phone call, facsimile, instant messaging, RSS or other syndication protocols, a web site, or a dedicated application.

Embodiments of step 140 may notify all or a subset of the matched potential service providers about the service request simultaneously. For example, the rate and quantity of service provider notifications may be controlled to:

1. Avoid sending potentially large numbers of notifications (e.g. email/SMS) which may incur extra costs for both the system operator and the service providers;
2. Avoid overwhelming consumers who could otherwise receive large numbers of service provider bids; and
3. Avoid overwhelming service providers because the highest-ranked matching service providers are offered the service first.

In a further embodiment, step 140 may use an exponential back-off algorithm to control the rate and quantity of service provider notifications as follows:

1. Select S service providers from the candidate pool (which could have many more service providers than S) and notify them of the service request
2. Wait for T minutes, where T is a time threshold value selected to give service providers adequate time to review service requests and respond, either by potentially submit bids or asking the consumer for more information about the service request:
  If an embodiment of the system receives >=K bids, where K is a minimum acceptable number of bids for a service request, go to (5).
  Else
    If an embodiment has >K/2 bids, an embodiment go to (3).
    Else an embodiment goes to (4)
3. Wait for another 2T minutes:
  If an embodiment receives >=K bids, go to (5).
  Else go to (4)
4. Send out service notifications to another 2S providers, update S=2S and then go back to (2)
5. Done and stop sending more service notifications Although this example uses a factor of two to determine the time delay between sending notifications to service providers, embodiments of the invention may use any arbitrary factor values to scale the rate and quantity of service provider notifications.

As an example, assume S=15, T=60, K=10, less than 5 bids in first 3 hours. An embodiment will send out: 15 notifications+30 notifications (one hour later and bids<5)+ 60 notifications (2 hours later and bids<5). In summary, this example will send out 105 service notifications.

In another example, if an embodiment receives 6 bids in the first hour, an embodiment will wait for another 2 hours to collect more bids before sending out more service notifications.

In an embodiment of the invention, service providers who are selected have a given amount of time to reply to the consumer's service request, either with follow-up questions about the service in step 145 or a bid for the service in step 150 (i.e., the price at which they would be willing to do the work). Throughout the auction and again when the auction concludes, the consumer is notified and receives a list of service providers who are available to do the service at the specified time, along with their corresponding bids. The consumer can view the service providers' business description, certifications and licenses, photographs of prior services, service history on the invention, and consumer ratings and reviews from past customers to help them make their decision. At this point, the consumer can select one or more service providers who most closely meet their needs and thereby schedule a service.

Step 145 facilitates communications between service providers and consumers. In an embodiment, step 145 allows service providers and consumers to communicate with each other via a variety of mechanisms, including email, SMS, phone call, and messages on a web site. For example, as discussed above, service providers who receive notification of a service match are provided with a given amount of time to respond to the request before it expires, except in the case of urgent requests, in which case the auction ends the instant a consumer selects a service provider who bids on their service request. One way a service provider may respond to a service request is with a clarifying question to help the service provider make a more informed choice about whether to bid and how much money to bid for a given service. In this example, step 145 communicates the service provider's questions to the consumer, who is then prompted to reply with answers. Similarly, an embodiment of step 145 allows consumers to ask questions and initiate other communications with one or more service providers during and following the auction. For example, a consumer may have a question about the bid submitted by one of the service providers. In this example, step 145 communicates the consumer's questions to one or more service providers, who are then prompted to reply with answers.

In an embodiment, communications between consumers and service providers, such as questions and subsequent answers, may be exposed to all service providers who receive the service request so that no one service provider has informational advantages over any other and so the consumer is not bothered by redundant questions from multiple service providers. In another embodiment, these communications may be private and not exposed to any other service providers that are not directly addressed by these communications.

Step 155 receives bids from service providers for service request. As discussed above, the other way that a service provider can respond to a service request is by submitting a bid to perform the service. After reviewing the service description, date, time and place the service is to be performed, photos of the service site or other relevant information, the service provider may enter an amount of money for which they would be willing to perform the service. The service provider's bid may be received in step 150 via a number of ways such as the service provider submitting the bid via a web site, an email, an SMS message, speaking into a telephone-based voice recognition system, contacting a call center, or other means. The bid could represent the price at which the service provider will perform a service in its entirety, an hourly rate, a fixed fee in addition to an hourly rate, or some other variation of the preceding. The bid may also specify whether it includes or excludes parts and materials, if relevant. The act of entering a bid may or may not represent a binding agreement to perform the service at the specified price.

For some types of service requests, service providers may prefer to visit the location of the service to estimate the cost of performing the service. In an embodiment, service providers can submit bids to perform an on-site estimate without committing to a final price to perform the service prior to an on-site estimate. In some cases, the bid to perform the on-site estimate could be free if the service provider is so willing. As discussed in detail below, a consumer can select one or more service providers, for example based on non-price attributes such as service provider quality and availability, to visit the service location and perform an on-site estimate. In one implementation of this embodiment, only service providers selected by the consumer to perform an on-site estimate are billed by the system. Unlike traditional lead generation systems, where service providers pay for each notification that a consumer may desire their services, this implementation does not charge service providers unless the consumer has expressed an explicit interest in hiring them. In another implementation of this embodiment, consumers, rather than service providers, are charged a fee to select and schedule an on-site estimate.

In some cases, the consumer may have specified multiple dates and times that a service could be performed or else specified a range of times during which the service could be performed. In these cases, the service provider may be prompted to select the exact date and time they will perform the service, so that the consumer knows when to expect the service provider.

Embodiments of step 150 can process bids according to any type of auction or bidding process known in the art, including: a blind auction, a limited auction, an open auction with limited information, and an open auction with full information.

In a blind auction, service providers place a bid without seeing any additional information. All bids are shown to the consumer, and the consumer is allowed to pick a bid from any service provider. Service providers are permitted to change their bids at any time during the auction.

In a limited auction, service providers place a bid without seeing any additional information. The invention computes an auction score for each service provider that is a combination of their bid score and quality score. In one implementation, the bid score may be computed as a normalization of the service provider's bid in comparison to other bids for the service request, and the quality score may simply be the Service Request Match Score. The bid score and quality score may be combined in a linear or non-linear fashion to compute an auction score. Only service providers who score above a certain auction score threshold or who rank in the top X auction scores amongst all possible matching service providers are considered for the service and shown to the consumer who requested the service. In another embodiment, only the top N service providers are shown to the consumer to pick from. Service providers are permitted to change their bids at any time during the auction.

In an open auction with limited information, service providers place a bid with limited information on what competing service providers have bid. Service providers could be shown the current minimum bid, the current average bid, and the number of bids placed at that point in the auction. In addition, service providers could be shown historical information about the winning bid for similar services. Service providers are permitted to change their bids at any time during the auction.

In an open auction with full information, service providers place a bid with access to nearly all information about other service providers competing for the same service. Service providers could be shown the current minimum bid, the current average bid, and the number of bids placed at that point in the auction. In addition, service providers could be shown historical information about the winning bid for similar services. Service providers could also be shown other information about the service providers who are bidding on the service request, such as their business description, consumer ratings, and credentials. Service providers are permitted to change their bids at any time during the auction.

In an embodiment, the auction process for urgent requests may also vary. As opposed to non-urgent requests which initiate an auction of fixed duration, urgent requests may be auctioned on 'first come-first serve' basis. Qualified service providers may continue to submit bids until the consumer selects a service provider, at which point the auction ends instantly, regardless of how much time has elapsed since the auction began. The bidding process may also vary for urgent requests. In addition to providing a quote for the service, service providers may be required to provide additional information such as an estimated time of arrival (ETA) at the service site so that this factor may be taken into account by the consumer during service provider selection.

In a further embodiment, if the consumer decides after initiating an auction that they do not want the service performed, they may cancel the auction before it ends. In this case, service providers who were already notified about the service request would be notified that the service request is no longer valid and the auction has ended due to consumer cancellation.

Upon receiving one or more bids from service providers for a service request, step 155 presents the received bids to the user. Embodiments of the invention include user interfaces for presenting bid received to help consumers more effectively sort through and understand the differences between the service providers who have bid on their service. In an embodiment, a default ordering of bids in the user interface presented by step 155 may include:
- Order by Bid Price—Order service providers based on bid price, ranked from lowest to highest
- Order by Consumer Rating—Order service providers based on consumer ratings from past services, ranked from highest to lowest
- Order by Ranking Score—Order service providers based on a ranking score that is a linear or non-linear combination of a quality score which in one implementation could simply be the service request match score and an index based on the service provider's bid price relative to competing service providers, ranked from highest to lowest.
- Order by Personalized Ranking—Order service providers based on consumer service history and/or preferences that the consumer explicitly selected in the service request (e.g. price sensitive, quality oriented, looking for bonded/insured, etc.)

In addition to the default ordering, the user interface presented by step 155 may enable the consumer to apply sorting or filtering options to help the consumer make their decision on which service provider to select. These sorting and filtering options include:
- Sort by price
- Sort by consumer rating
- Sort by time of service
- Only bonded providers
- Only insured providers
- Only service providers with consumer rating high than Y stars
- Only service providers who have completed more than Y services through the invention, where Y is any positive number specified by the system or the consumer.

In an embodiment of step 155, throughout the duration of the auction, consumers can view service provider bids coming in real-time on a web page, mobile device web page or application, or other medium that that pertains to the service they requested. A user interface can include the following information about each service provider:
- Service provider's name
- Bid price
- Average consumer rating from past services
- Chart of consumer ratings from past services plotted over time
- Histogram of distribution of past consumer ratings
- Self-description of service provider's business and services
- Photographs, videos or other multimedia relating to previous jobs done by service provider
- Social graph connections between consumer and service provider
- Detailed past reviews, consumer ratings, endorsements, and ratings from prior users of the service provider, advice or recommendations from peers of the consumer in one or more social graphs, and third-party websites and content providers.

Embodiments of step 155 can include these and other filtering, sorting, and display elements in the user interface to enable the consumer to in-place load and read the full profile of each service provider, thereby enabling the consumer to make an informed decision on which service provider to select based on business description, reputation, bid price, time and date the service provider can perform the service, and other information. FIG. 2, discussed below, illustrates an example user interface 200 for reviewing and selecting bids according to an embodiment of the invention.

In a further embodiment, step 155 can use the social graph of a consumer and his or her peers to provide additional information about service providers and their bids. As discussed in detail below, a social graph is the set of relationships between a consumer and other people or entities, referred to generally as peers. The relationships in a social graph may be any type of professional, social, or relationship, such as friendship relationships, kinship relationships, business relationships, professional relationships, or relationships based on common interests or needs, Social graphs are often implicitly embedded in the applications and services used by a consumer, such as e-mail or contact management applications. Consumers may also explicitly define their social graph using one or more dedicated social network services or applications to specify relationships with other people or by specifying one or more of their interests or affiliations. In the latter case, the social network service may then define relationships between the consumer and other users of the service having similar interests or affiliations.

An embodiment of step 155 accesses one or more of a consumer's social graphs to identify the consumer's peers. Many social network services and applications provide interfaces, such as APIs or web services interface, which allow embodiments of the invention to access or determine the consumer's peers in one or more social graphs. Step 155 may then identify peers of the consumer that have previously selected one or more of the service providers presenting a bid for the consumer's service request. Step 155 may then present the comments, reviews, ratings, and recommendations of these peers with respect to the current set of service providers separately or in aggregate to the consumer. For example, step 155 may inform the consumer that one or more of their peers previously selected a specific service provider for a similar service. In another example, step 155 may present the consumer with an aggregate rating for a service provider based on the ratings provided by his or her peers. This rating may be in addition to or instead of a system-wide rating from all users of this service provider. For example, peers of a consumer may vote yes or no on whether to accept a bid from a service provider. Step 155 may present the consumer with the total votes received for each bid and/or the votes of each peer. In a further example, step 155 may preferentially present reviews or comments about a service provider from the consumer's peers.

Step 160 receives a bid selection from a consumer for the service request. After the consumer initiates a service request and receives one or more bids from service providers, embodiments of the invention enable the consumer to select a service provider who has bid for their service during or after an auction. The bid selection may be a selection of one or more of the bids received by the service providers. In a further embodiment, if the consumer has specified multiple possible times and/or locations that the service may be performed, then the bid selection may also include the exact date and time they will perform the service, so that the consumer knows when to expect the service provider.

In a further embodiment, multiple bids may be selected by the consumer. For example, the consumer may select multiple bids if the service requires multiple service providers to perform the service. In another example, if the desired service requires an on-site estimate or other evaluation by a service provider, then the consumer may select multiple bids to schedule times and locations for the associated service providers to visit the service location for this evaluation.

During an auction, if a consumer feels they have received a sufficient number of bids for their service or sees a service provider they would like to select before the auction has ended, the consumer may end the auction early by selecting a service provider. At this point, service providers who bid on the service but were not selected by the consumer and service providers who were notified about the service but did not bid would be sent a notification that the auction has concluded and a winner has been selected by the consumer.

Once an auction's fixed duration expires, the auction ends and the consumer can review and select a service provider from the list of service providers who bid for their service. At this point, service providers who bid on the service but were not selected would be sent a notification that the auction has concluded and a winner has been selected by the consumer.

An embodiment of step 160 notifies service providers when their bids are selected by consumers. In embodiments of step 160, service providers can be notified if they are selected by the consumer via a variety of mechanisms, including email, SMS, phone call, and messages on a web site. The notification could inform the service provider that they won the service request and provide the exact address of the service site, and confirm the date and time at which the service is to be performed. The invention may also provide additional tools to manage service requests which have been won and scheduled. For instance, features such as service schedule management, service time rescheduling, service cancellation, upcoming job reminders, and facilitated communication with the consumer may all be features that become available to the service provider upon winning a service request auction.

In an embodiment of step 160, service providers may be charged a success fee in the event they win a service. The fee may be calculated as a percent of the winning bid, percent of hourly fee, a flat price, or some other variation of the preceding. The success fee may apply only to service providers who win a service as opposed to all service providers who received the service lead but ultimately did not win the service. The fee may be charged to a credit card, an online payment service account, a bank account, or other means of payment that the service provider provided during registration. Payment may be required instantly upon winning a service, after the service is performed, or at a set time, such as monthly.

In an embodiment, if the consumer is not happy with the bids they received after the auction ends, the consumer may extend the auction, in which case the method 100 proceeds from step 155 back to step 135 to identify further qualified service providers and solicit further bids from a new set of qualified service providers and/or the original set of service providers.

In a further embodiment, service providers with established relationships with the system can forward a winning bid for a service or a bid solicitation to another service provider who they deem to be more qualified, better suited, or more available to do the work. The act of forwarding a service to another service provider may forfeit the right of the original service provider to bid on the service. To ensure service providers only forward services to other service providers who are well-qualified for the service, a notion of shared reputation via ratings/reviews could be utilized such that the original service provider's own reputation on the invention is impacted by the rating ultimately received by the referred service provider should they win the service and be rated.

If a referred service provider has never used the system but is forwarded an invitation to bid on a service via email, text message, or other means, then the referred service provider will need to first register for the system. Upon registering, they are then permitted to bid on the service request like any other service provider who matched for the service. Thus, the service provider is provided with a strong incentive to sign up quickly in that they can immediately bid on a live service.

In another embodiment, an unregistered service provider receiving a referral may bid on a service request prior to registering with the system. Following the submission of a bid, the unregistered service provider may be prompted to register with the service to receive the information necessary to complete the service request, such as the consumer's contact information.

Following the time and date a service is scheduled to be performed, step 165 may prompt consumers to enter a numerical or qualitative consumer rating and/or review of the service provider's performance. This information could then be used by subsequent consumers who are considering using the same service provider for their service needs. A notification to request a consumer rating/review could be sent to the consumer via a variety of mechanisms, including email, SMS, phone call, and messages on a web site. Incentives could be offered to the consumer to leave consumer ratings/reviews. For instance, a fee could be levied on the consumer for subsequent use of the invention if they consistently do not leave consumer ratings/reviews on past services. Alternatively, a monetary or non-monetary award could be offered to consumers each time they leave a new consumer rating/review. The consumer ratings/reviews may be more accurate or comprehensive than competing services offering user-generated consumer ratings/reviews because consumers are only able to leave consumer ratings/reviews for service providers they actually used to perform a service through the system, resulting in fewer uninformed, biased, or bogus consumer ratings/reviews.

Over time, service providers will develop a "reputation" on the invention which may be used in the service matching algorithm and in helping consumers to select from among multiple service providers who have provided a bid for their service.

Service Provider Reporting

To give service providers an overview of where they stand compared to other service providers, as well as help them to receive more service matches and win more auctions, an embodiment of the invention will provide a report center that is personalized for each service provider. The report center can include competitive positioning reports and performance improvement reports.

Competitive positioning reports include comparisons to other service providers similar in occupation, skills, location, or other attributes with the goal of helping them to understand their relative attributes compared to their competition. Examples of competitive positioning reports could include:

Average Bid—Average bid price on: 1) services the service provider has bid on over time, 2) services within the service provider's occupation type, 3) services within the service provider's occupation type in the geography served by the service provider, 4) services within the service provider's occupation type and consumer rating Average Consumer Rating—Average consumer rating for: 1) all service providers within the service provider's occupation type, 2) all service providers within the service provider's occupation type in the geography served by the service provider Number of Reviews—Average number of reviews the service provider has in comparison to other service providers: 1) within the service provider's occupation type, 2) in the service provider's occupation type within the geography served by the service provider Response Time—Average response time to a bid in comparison to other service providers: 1) within the service provider's occupation type, 2) within the service provider's occupation type in the geography served by the service provider Amount of Profile Information and Images—Percentage uplift in bids won that result from uploading an additional description of completed services in the form of text, pictures, video, audio, electronic documents, or other multimedia data, as well as full business descriptions, and additional skills tags Performance improvement reports can help service providers receive more service matches. Examples of performance improvement reports include:

Work Area Expansion—Percentage increase in services the service provider could expect by expanding their work area radius by a given amount. Service providers could dynamically change the work area to see how much it impacts the expected number of service matches. An optimized work area radius could also be recommended (e.g., the smallest increase in area that would result in the largest possible increase in service matches)

Work Hour Expansion—Percentage increase in services that the service provider could expect by expanding or changing their hours of availability for a given day. Service providers could dynamically change work hours to see how much it impacts the expected number of service matches. An optimized availability setting could also be recommended (e.g., the smallest increase or change in work hours that would result in the largest possible increase in service matches)

Additional Skills Tags—Potential skill tags service providers could add to their profile generated by comparing their existing set of skill tags with similar service providers and identifying which skills tags are missing. By adding skills tags the service provider could expand the types of service requests with which they could match General Feedback—Show service providers which attributes may be preventing them from getting more offers (e.g., low consumer ratings, high priced bids, long response time, high cancellation rate, etc.).

An embodiment of the invention provides a list of engagement modules, which are informational messages or aggregated data generated by the invention displayed to consumers and service providers for the purposes of education, information, training, or entertainment. Engagement modules designed for consumers may offer ideas for possible service requests, encouragement to enter new service requests, or data on the amount of time and money saved using the invention. Some examples of consumer engagement modules may include:

Display amount of money consumers have saved by computing the difference between the final bid selected and average bid price for service requests or a subset of service requests Display amount of time consumers can save by using Red Beacon as compared to average time consumers would spend calling service providers by phone Display most popular services in consumer's neighborhood, city, or state Display previous service reviews similar to consumer's current service request Display useful informational resources or content related to consumer's past service requests (e.g. how to maintain a carpet if you requested a carpet cleaner before)

Display seasonal services to consumers (e.g. gardening season is coming up and show examples of landscaping and home gardening service requests)

Promote special offers from service providers in consumer's geographic area. Clicking on the special offers initiates a service request with some information already filled in and guarantees a service match with the service provider promoting the special offer. The promoted special offer may be a sponsored result, for which the service provider must pay additional money to display the offer or if they win a service request generated from their promotion Display potential amount of money consumers could earn by creating new or additional skills profiles assuming an occupation type, number of hours, and geographic area to work The invention also provides engagement modules for service providers to offer them insights into consumers' desires, help them to be more competitive with service matching and bidding, and generally increase their revenue and business opportunities. Some examples of service provider engagement modules may include:

Display percentage uplift in winning bids from uploading additional description of the completed services in the form of text, pictures, video, audio, electronic documents, or other multimedia data to gain consumers' confidence Display service requests related to provider's occupation with tips on how to match that request, thereby allowing them to improve their skills profile Display average bid prices on various services related to providers' occupation in their city to allow for more competitive bidding Display suggested keywords/tags to service providers based on other service providers in their neighborhood and occupation Display percentage of service requests that service providers miss because of their existing operating hours so as to encourage them to extend or alter their hours to serve reach more consumers Display percentage of service requests that service providers miss because of their existing work radius so as to encourage them to extend or alter their service area to more different geographies As described above, method 100 allows consumers to select service providers for service requests using an auction process. Further embodiments of method 100 may be adapted to non-auction processes. For example, a service provider may request the contact information for the consumer to perform an on-site quote for the service request, rather than submit a bid online. An embodiment of method 100 allows service providers to bypass the bid submission and receive the consumer's contact information in exchange for payment of a flat fee.

In another example of an auction alternative, a consumer may wish to speak with or visit the service provider and schedule the service offline, rather than selecting a bid online. In this example, the method 100 allows consumers to receive the contact information of the service provider in exchange for a payment of a flat fee by the selected service provider.

FIG. 2 illustrates an example user interface 200 for reviewing and selecting bids according to an embodiment of the invention. Embodiments of user interface 200 may be presented to consumers as a web page within a web browser, within any other type of application, and within a dedicated application adapted to communicate with the system.

User interface 200 includes a service description area 205, which displays information about a service request submitted by a consumer. The service description area 205 may include text, pictures, video, animation, sound and music, and/or any other type of multimedia information by the consumer to describe the service request.

The service description area 205 also includes a status indicator 207, which indicates the current stage of processing of the service request, such as processing a service request, matching a service request to service providers, soliciting and receiving bids for the service request from service providers, and the bidding ended for the service request.

User interface 200 also includes a messaging area 210 that displays questions, comments, and other communications between service providers and consumers. As discussed above, the communications between service providers and consumers during the auction time period may include requests by service providers for more information about a service request and responses from the consumer. These communications may be in the form of text, pictures, video, animation, sound and music, and/or any other type of multimedia information.

Bid review area 215 includes a list or other presentation of some or all of the bids received from service providers for the service request. The bid review area 215 can include a description of each bid, which may include the name of the service provider; a bid price for the service request; one or more reviews of the service provider, which may be provided by other consumers of the system or from an external source, such as a reviews or rating web site; and a rating of the service provider, which may be determined by aggregating reviews and other data from multiple consumers using the system or from an external source. In a further embodiment, bid review area 215 may display reviews and ratings of service providers and/or recommendations or advice on bids received from peers of the consumer. As discussed below, the peers of the consumer may be identified by accessing one or more social graphs of the consumer. In an embodiment, more detailed information about one or more of the service providers having bids in the bid review area may be presented in bid review area 215. The bid review area may include one or more filtering user interface controls 220 to sort and filter bids from the service providers according to consumer defined criteria, such as cost, rating, service provider qualifications or credentials, proximity, or any other attribute associated with bids or service providers. The bid review area 215 can also include one or more user interface controls 225 to enable the consumer to select a bid as the winner of the auction and initiate the performance of the requested service by the selected service provider. Bid selection user interface controls can also be used to set a desired time for performance of the service by the selected service provider.

As described above, embodiments of the user interface 200 may be implemented in the form of a web page. In further embodiments, user interface 200 and the associated system may be embedded in one or more third-party web sites. For example, user interface 200 may be adapted to include the branding of one of a plurality of third-party web sites, depending upon which web site the consumer uses to access the system. In another example, user interface 200 can be implemented as a widget, applet, or small task specific application that may be embedded in a third-party web site.

Additionally, the content of the user interface 200 may be tailored to the third-party web site that is presenting the user interface 200. For example, the bid review area 215 may display reviews and ratings from general users of the third-party web site or from users of the third-party web site that are also peers of the consumer. Continuing with this example, if two or more third-party web sites are both presenting separate embedded versions of user interface 200, users of each of these web sites may be presented with different sets of reviews and ratings based on each web site's membership.

In implementations that embed the user interface 200 within a third-party web site, the features and users of the third-party web site may be used to acquire service providers and solicit service requests from consumers. For example, the third-party web site may have a set of users that have registered or otherwise have accounts with this web site. An embodiment of the invention may use this set of user accounts as a source of consumers and/or service providers. In one implementation, an embodiment of the invention matches service requests from users of the third-party web site only with service providers also associated with this same web site. In another implementation, service requests from users associated with the third-party web site may receive bids from any service providers known to the system, regardless of whether the service providers are associated with third-party web site. In still another implementation, service providers associated with a third-party web site may be eligible to receive service requests from consumers that are not associated with this web site.

Figure 3:
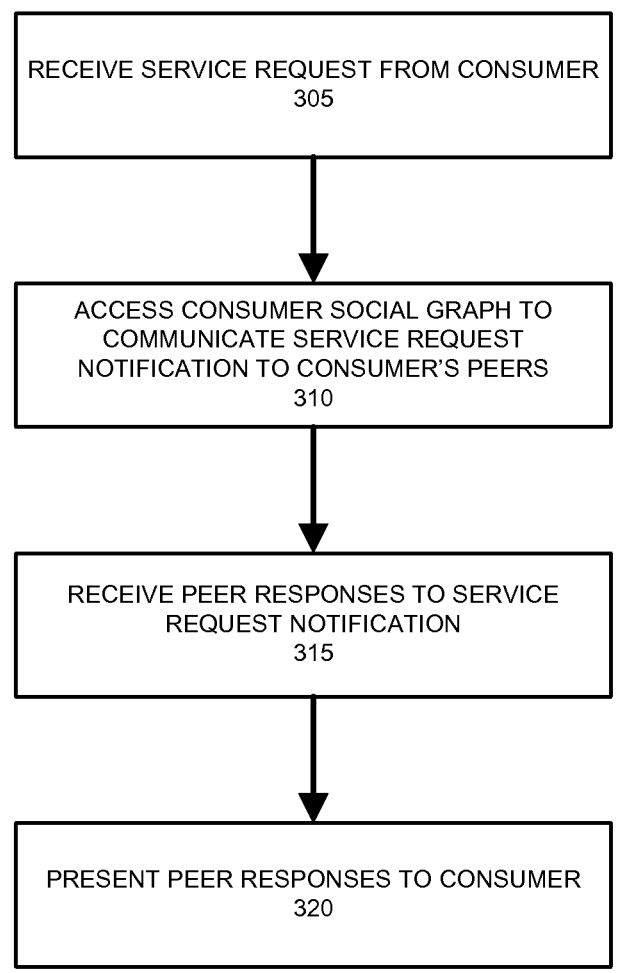
FIG. 3 illustrates a method for leveraging social graphs to facilitate fulfilling service requests according to an embodiment of the invention.

A further embodiment of the invention enables a consumer to leverage their social graph to help fulfill service requests. FIG. 3 illustrates a method 300 for leveraging social graphs to facilitate fulfilling service requests according to an embodiment of the invention. Step 305 receives a service request from a consumer. As with step 130 above, step 305 may receive a service request from a consumer via a web site or an application. The service request may include a service description provided by the consumer. The service description may include the type or a description of the service requested by the consumer and constraints or requirements associated with the service, such as a location or time that the service needs to be performed.

A consumer may also provide an additional description of the service in the form of text, pictures, video, audio, electronic documents, or other multimedia data.

Step 310 accesses one or more of a consumer's social graphs to communicate the service request to the consumer's peers. Many social network services and applications provide interfaces, such as APIs or web services interface, that allow embodiments of the invention to access or determine the consumer's peers in one or more social graphs. For example, step 310 may access an API associated with an e-mail application to retrieve a list of people that the consumer frequently exchanges e-mails with. This list of people may be used as a social graph by method 300. In a similar example, step 310 may access an API or other interface provided by a social network service to retrieve a list of the consumer's peers within the social graph provided by the social network service. As an alternative to retrieving a list of peers from a social network service, an embodiment of step 310 may utilize a peer notification service provided by the social network service, as discussed in detail below.

Embodiments of step 310 send a notification of the consumer's service request to all or a portion of the consumer's peers in one or more of the consumer's social graphs. In one embodiment, step 310 sends the notification of the consumer's service request to one or more lists of peers retrieved from an application or a social network service. Step 310 may use e-mail, SMS, or a communications or messaging capability provided by an application or social network service to send the notification to one or more of the consumer's peers.

In another embodiment, step 310 submits the notification of the consumer's service request to a peer notification service provided by a social network service. The social network service then communicates the notification with one or more of the consumer's peers. In this embodiment, the social network service may select only a portion of a consumer's peers to receive this notification, based on the preferences of the consumer, such as privacy preferences, and the preferences of the consumer's peers, such as a peer's privacy preferences and interest preferences.

For example, a consumer may have a privacy preference associated with their social network account that limits notifications to a subset of his or her peers. In this example, the social network service may limit the communication of the notification provided by step 310 to this subset of peers in accordance with the consumer's privacy preference. In another example, a first peer of a consumer may have an interest preference in the social network service to receive every notification from the consumer by default, while a second peer of the consumer may have an interest preference that hides notifications from the consumer by default, unless specifically requested by the second peer. In this example, the social network service will present the notification provided by step 310 to the first peer by default, but will not present this notification to the second peer unless the second peer specifically requests notifications from the consumer.

The notification of the service request communicated by step 310 may include a presentation to the peer of all or a portion of the consumer-provided service description from the service request, such as the type or a description of the service requested, constraints or requirements associated with the service, and/or additional description of the service in the form of text, pictures, video, audio, electronic documents, or other multimedia data. The notification of the service request can also include a list of one or more service providers selected to bid on the service request. In a further embodiment, the notification of the service request may be updated with bids received from service providers, so that a peer may view the current bids on the service request.

In an embodiment, the notification of the service request presented to peers may include one or more user interface elements enabling the peer to respond to the consumer's service request. Step 315 receives peer responses to the service request notification from one or more peers. Peer responses to a service request may include peer reviews or ratings of a bid and/or a service provider; peer comments on the service provider, service request, or one or more of the bids; and/or a peer suggestion of an additional service provider to receive the service request. Peer comments and peer reviews and ratings may include quantitative evaluations, such as a numerical quality score or a vote of yes or no to select a service provider or bid; and qualitative evaluations, such as comments from the peer in the form of text or any other type of multimedia data.

A peer suggestion of an additional service provider may include the name, address, and/or contact information of the additional service provider. A further embodiment of the invention may assist with peer suggestions of additional service providers by automatically matching the name of the service provider provided by the peer with contact information retrieved from internal or external databases of service providers. For example, in some cases, an additional service provider suggested by the peer may already be registered with the system. In this situation, the system may match the peer suggestion with the contact information from service provider profile from its internal database of service providers. In another example, an additional service provider suggested by the peer may be matched with contact information from an external database of service providers, such as a general-purpose telephone directory, search engine results, or a profession or trade association directory.

In an embodiment, if a suggested service provider is not registered with the system, an embodiment of the system enables this service provider to register with the system before or after receiving the bid solicitation.

Step 320 presents peer responses to the consumer. In an embodiment, peer responses to the service request notification are presented to the consumer along with bids received from the service providers and service provider information provided by the system. For example, peer responses, such as service provider reviews and ratings or recommendations or advice on any or all of the bids received by the user, may be integrated into the user interface 200 discussed above. Thus, the consumer can review bids and service provider reviews provided by the system together with the reviews, ratings, and comments provided by the consumer's peers. In a further embodiment, step 320 may aggregate quantitative peer responses, for example by presenting the total number of yes and no votes for each bid or the peer average rating of a service provider.

If a peer response includes a suggestion of an additional service provider, an embodiment of step 320 sends a bid solicitation to the suggested service provider. This additional service provider is then processed in a manner similar to the other service providers, as discussed in steps 145 to 165 above.

In a further embodiment, peer responses to the service request notification are shared with the peers as well as the consumer. Thus, method 300 may proceed from step 320 back to step 310 to provide peers with updated service request notifications that include previously received peer responses. Method 300 may be repeated multiple times as further peer responses are received and presented to the consumer and other peers. In a further embodiment, when a peer of the consumer provides a peer response, the peer response may be provided to peers of that peer. Thus, the number of people available to provide peer responses, or who become aware of the service itself, may expand beyond the initial set of the consumer's peers.

Embodiments of method 300 may be performed asynchronously and in parallel with method 100 discussed above. Additionally, the steps of method 300 may be integrated with method 100. For example, peer responses to the service request notification may be included in step 155 when the bids are presented to the consumer. In another example, service providers suggested by a peer can be included in the steps 140 to 165.

Figure 4:
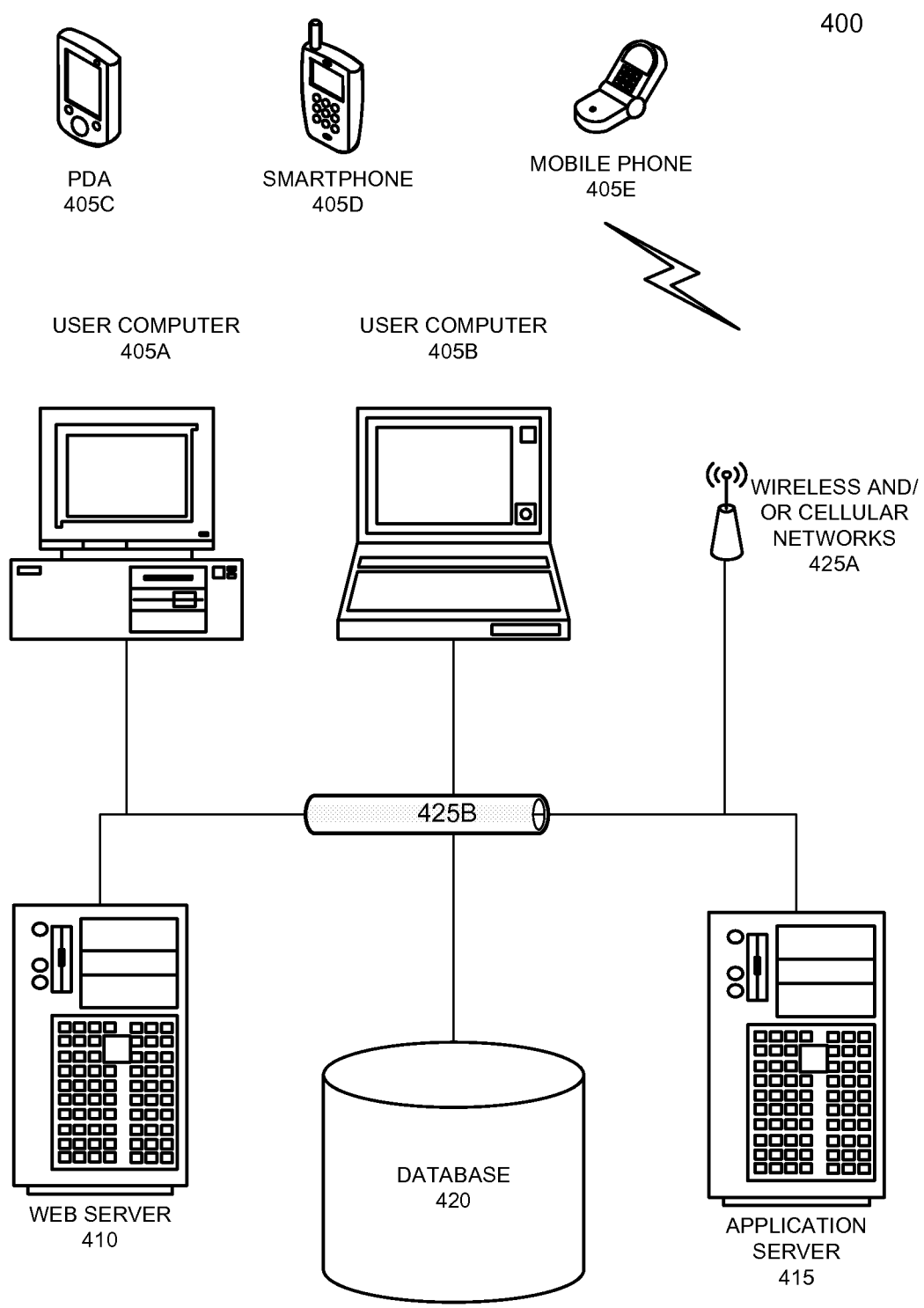
FIG. 4 illustrates an example system architecture suitable for implementing an embodiment of the invention.

FIG. 4 illustrates an example system architecture 400 suitable for implementing an embodiment of the invention. The system includes user computers 405 including portable 405a and desktop personal computers 405b, personal digital assistants 405c, smartphones 405d, and mobile phones 405e. The system can interface with any type of electronic device, such as a thin-client computer, Internet-enabled mobile telephone, mobile Internet access device, electronic book, or personal digital assistant, capable of displaying and navigating web pages or other types of electronic documents. Although system is shown with five user computers, any number of user computers can be supported.

A web server 410 is used to process requests from web browsers and standalone applications for web pages, electronic documents, social media networking service content, and other data from the user computers. The web server 410 may also provide syndicated content, such as RSS or Atom feeds, of data related to service requests, service providers, bids, and consumer feedback.

Application server 415 operates one or more data applications. The data applications can be implemented as one or more scripts or programs written in any programming language, such as Java, C, C++, C#, or any scripting language, such as JavaScript or ECMAScript, Perl, PHP, Python, Ruby, or TCL. Data applications can be built using libraries or application frameworks, such as Rails or .NET.

The data applications on application server 415 process input data and user computer requests and can store or retrieve data from database 420. Database 420 stores data created and used by the data applications. In an embodiment, the database 420 is a relational database, such as MySQL, that is adapted to store, update, and retrieve data in response to SQL format commands.

In an embodiment, the application server 415 is one or more general purpose computers capable of executing programs or scripts. In an embodiment, the web server 410 is implemented as an application running on one or more general purpose computers. The web server and application server may be combined and executed on the same computers.

An electronic communication network 425 enables communication between user computers 405, web server 410, application server 415, and database 420. In an embodiment, network 425 may further include any form of electrical or optical communication devices, including wireless 425a and wired 425b networks. Network 425 may also incorporate one or more local-area networks, such as an Ethernet network; wide-area networks, such as the Internet and cellular carrier data networks; and virtual networks, such as a virtual private network.

The system is one example for executing data applications according to an embodiment of the invention. In another embodiment, application server, web server, and optionally database can be combined into a single server computer application and system. In alternate embodiment, all or a portion of the web server and application functions may be integrated into an application running on each of the user computers. For example, a JavaScript application on the user computer may be used to retrieve or analyze data and display portions of the applications.

Further embodiments can be envisioned to one of ordinary skill in the art. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer implemented method comprising:
receiving, at one or more computers via a user interface, a service request from a user that comprises a natural language service description of a service to be performed;
receiving, at the one or more computers via the user interface, a picture or a video relating to the service request;
automatically selecting, by the one or more computers, a subset of potential service providers matching the service request;
automatically sending, using the one or more computers, a solicitation to bid on the service request to only each potential service provider in the subset of potential service providers;
in response to the solicitations, receiving, at the one or more computers, one or more bids from at least a portion of the subset of potential service providers;
presenting, using the one or more computers, the one or more bids to the user on the user interface having a bid review area, the bid review area comprising:
one or more results each corresponding to the one or more bids from the portion of the subset of potential service providers, each of the one or more results having a corresponding description of the one or more bids;
each description comprising information about a given bid and its associated potential service provider, wherein the description is selectable by the user;
one or more reviews relating to a first description that is currently selected, wherein a user selection of a second description causes one or more reviews relating to the second description to be displayed in place of the one or more reviews relating to the first description while concurrently displaying the one or more results along with the one or more reviews relating to the second description; and
a user interface control element associated with each of the one or more bids, wherein each one of the user interface control elements is selectable by the user to accept one of the one or more bids;
receiving, from the user via the user interface at the one or more computers, a selection of a first user interface control element indicating acceptance of at least one of the one or more bids; and
notifying, using the one or more computers, a first one of the subset of the potential service providers corresponding with the selected one of the one or more bids, wherein the notification indicates a bid acceptance by the user.

2. The method of claim 1, wherein the service description comprises at least one constraint on performance of the service, and wherein the at least one constraint comprises a service location or a service time.

3. The method of claim 2, wherein the service time is immediately upon selection of the first one of the one or more bids.

4. The method of claim 2, wherein each of the one or more bids comprises a prospective acceptance of the service time by the service provider and the acceptance of the bid by the user completes a scheduling of the service.

5. The method of claim 1, comprising:
receiving a service provider evaluation from the user; and
associating the service provider evaluation with a service provider profile of the first one of the subset of the potential service providers.

6. The method of claim 1, wherein selecting the subset of potential service providers comprises analyzing service provider profiles associated with the potential service providers for suitability with the service request, wherein the suitability of service provider profiles comprises:
satisfying hard constraints associated with the service request; and
ranking service providers according to soft constraints.

7. The method of claim 6, wherein the ranking of service providers comprises:
determining service match scores based on weighted sums of the soft constraints.

8. The method of claim 1, wherein selecting the subset of potential service providers comprises:
identifying at least one previously received service request similar to the service request from the user;
identifying at least one service provider associated with the previously received service request; and
including the identified service provider in the subset of potential service providers.

9. The method of claim 1, comprising:
charging a matching fee to an account of the first one of the subset of the potential service providers in response to receiving the selection of the one of the one or more bids from the user.

10. The method of claim 1, wherein presenting the one or more bids to the user comprises:
presenting social graph connections between the user and the portion of the subset of potential service providers.

11. The method of claim 1, comprising:
providing a service request notification to at least one peer of the user via a social graph interface, wherein the social graph interface provides access to a social graph of a user that is maintained by an application or service;
receiving a peer response to the service request notification from at least a first peer; and
presenting the peer response to the user.

12. The method of claim 11, wherein providing the service request notification comprises:
retrieving at least a portion of the social graph of the user via the social graph interface, wherein the portion of the social graph of the user comprises the peer; and
sending the service request notification to the portion of the social graph of the user.

13. The method of claim 11, wherein providing the service request notification comprises:
providing the service request notification to a peer notification service via a social interface, wherein the peer notification service is adapted to select at least a portion of the social graph of the user including the peer to receive the service request notification based on a preferences of at least the peer.

14. The method of claim 11, wherein the service request notification comprises at least one of the service description or the one or more bids from at least the portion of the subset of potential service providers.

15. The method of claim 11, wherein the peer response comprises at least one of a peer recommendation of an additional service provider or a peer evaluation of at least a second one of the portion of the subset of potential service providers.

16. The method of claim 15, comprising:
in response to receiving the peer response:
sending a bid solicitation to the additional service provider;
receiving a bid from the additional service provider; and
presenting the bid from the additional service provider to the user.

17. The method of claim 11, comprising:
in response to receiving the peer response from the first peer, providing a second notification to at least a second peer of the first peer via the social graph interface, wherein the second notification indicates that the peer response was received from the first peer.

18. The method of claim 17, wherein the second peer is not directly connected with the user within a social graph of the user.

19. The method of claim 11, wherein the peer response is presented to the user on the user interface as part of the one or more reviews.

20. The method of claim 1, wherein the user interface further comprises a status indicator indicating the current stage of processing of the service request.

21. The method of claim 1, wherein the user interface further comprises messaging area displaying communications between at least one of the subset potential service providers and the user.

22. The method of claim 1, wherein the user interface further comprises a filtering user interface control element, and wherein the method comprises receiving, at the one or more computers via the user interface, an interaction with the filtering user interface control element to sort or filter the one or more bids presented in the bid review area.

23. A computer implemented method comprising:
receiving, at one or more computers via a user interface, text representing at least a portion of a service request comprising a portion of a natural language service description of a service to be performed;
determining, at the one or more computers, one or more automatic suggestions related to the portion of the natural language service description;
displaying, on the user interface, the one or more automatic suggestions;
receiving, at the one or more computers via the user interface, a selection of one of the one or more automatic suggestions, wherein the selection represents a service request;
receiving, at the one or more computers via the user interface, a picture or a video relating to the service request;
automatically selecting, by the one or more computers, a subset of potential service providers matching the service request;

automatically sending, using the one or more computers, a solicitation to bid on the service request to only each potential service provider in the subset of potential service providers;

in response to the solicitations, receiving, at the one or more computers, one or more bids from at least a portion of the subset of potential service providers;

presenting, using the one or more computers, the one or more bids to the user;

receiving, from the user via the user interface at the one or more computers, a selection of a first user interface control element indicating acceptance of at least one of the one or more bids; and notifying, using the one or more computers, a first one of the subset of the potential service providers corresponding with the selected one of the one or more bids, wherein the notification indicates a bid acceptance by the user.

24. The method of claim 23, wherein the portion of natural language service description of a service to be performed comprises a portion of an occupation name.

25. The method of claim 23, determining the one or more automatic suggestions comprises matching the portion of the natural language service description to full names in a database.

26. A computer implemented method comprising:

receiving, at one or more computers via a user interface, a service request from a user that comprises a natural language service description of a service to be performed;

receiving, at the one or more computers via the user interface, a picture or a video relating to the service request;

automatically selecting, by the one or more computers, a subset of potential service providers matching the service request, wherein the automatic selection comprises:

determining a location of the service provider, determining a location of the service site, determining an estimated time to travel between the location of the service provider and the location of the service site, and selecting the subset of potential service providers based at least in part on the estimate time to travel;

automatically sending, using the one or more computers, a solicitation to bid on the service request to only each potential service provider in the subset of potential service providers;

in response to the solicitations, receiving, at the one or more computers, one or more bids from at least a portion of the subset of potential service providers;

presenting, using the one or more computers, the one or more bids to the user;

receiving, from the user via the user interface at the one or more computers, a selection of a first user interface control element indicating acceptance of at least one of the one or more bids; and notifying, using the one or more computers, a first one of the subset of the potential service providers corresponding with the selected one of the one or more bids, wherein the notification indicates a bid acceptance by the user.

27. The method of claim 26, wherein the estimated time to travel is further based on traffic conditions between the location of the service provider and the location of the service site.

28. The method of claim 27, further comprising receiving the traffic conditions via an application program interface (API) from an online source of traffic data.

* * * * *